United States Patent Office 3,003,589
Patented Oct. 10, 1961

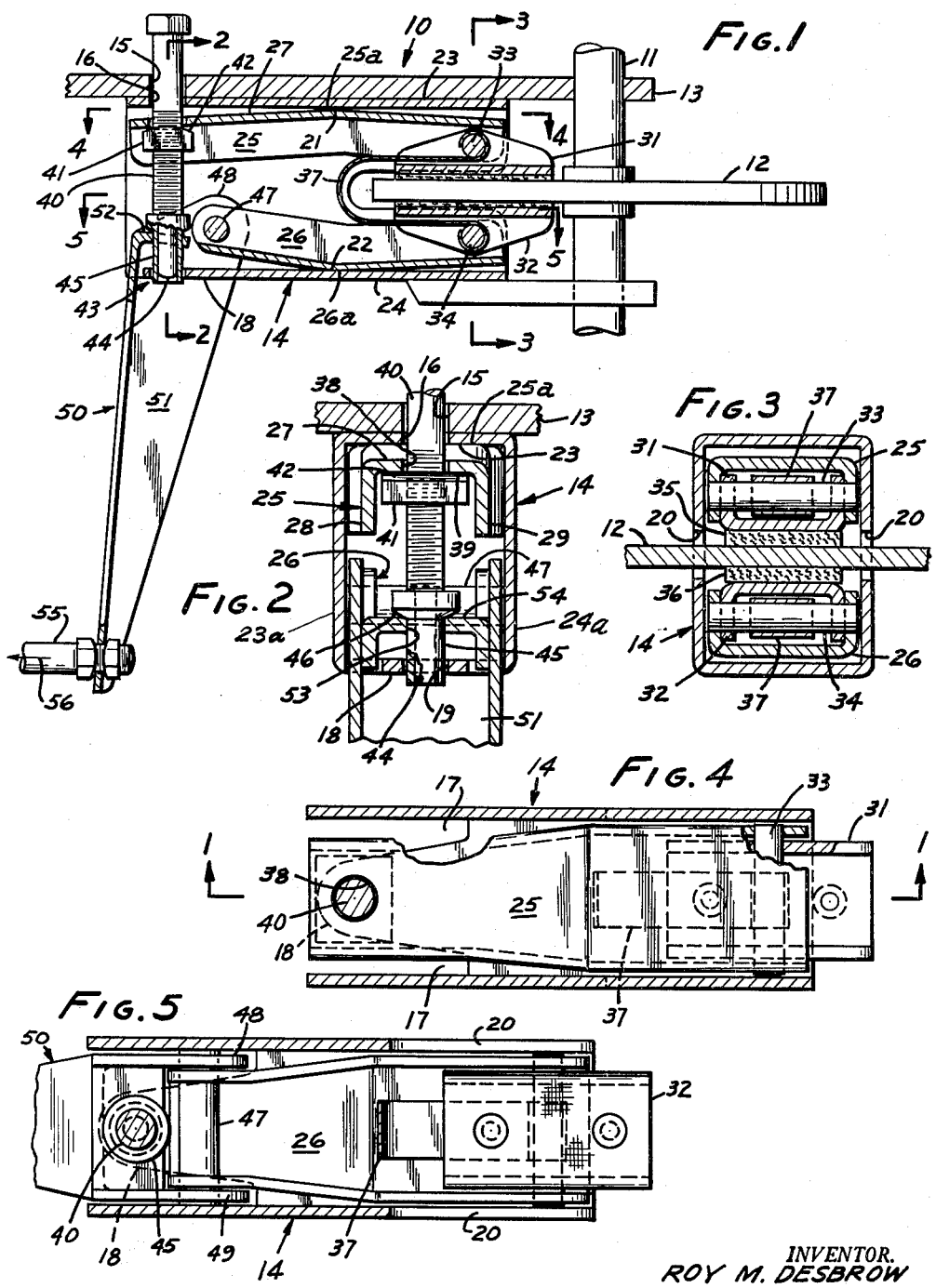

3,003,589
VEHICULAR BRAKE
Roy M. Desbrow, Azusa, Calif., assignor to Azusa Engineering, Inc., Irwindale, Calif., a corporation of California
Filed Aug. 22, 1960, Ser. No. 50,990
9 Claims. (Cl. 188—73)

This invention relates to a vehicular brake.

An object of this invention is to provide a vehicular brake of the disc-type in which the parts are easily adjusted, and also are easily removed and replaced. It is a brake which is very suitable for racing vehicles, particularly for those miniature engine propelled types commonly known as "karts." It is to be understood, however, that this brake is useful in connection with all types of vehicles, but finds its preferred application in connection with these light-weight types.

A brake according to this invention includes a rotatable disc mounted either directly to an axle, or somehow rotatably connected to it. There is a housing mountable to structure which is fixed relative to the disc or axle, the housing providing a pair of fulcrum points for a pair of brake arms. The braks arms are located on opposite sides of the disc and carry at one side of their fulcrum points a pair of brake shoes that are opposed to each other across the disc so as to slow down the disc when the arms move the shoes against the disc.

The housing has an aperture lying in the plane of rotation of the brake arms, and through this aperture and the closest of the brake arms there is passed a threaded bolt. A nut is threaded onto this bolt so that the brake arm is between the nut and the said closest brake arm so that the nut can bear against this brake arm to pivot the arm and press one of the brake shoes against the disc. A shoulder is provided on the bolt at a location spaced from the nut. This shoulder bears against a lever, which lever is pivotally mounted to the other brake arm. The fulcrum point of this other brake arm lies between the latter pivotal mounting and the respective brake shoe. Pulling the lever in a direction generally away from the brake shoes counter-rotates the brake arms to force both brake shoes against the disc, and thereby brake it.

According to a preferred but optional feature of this invention, the shoulder is provided in the form of a sleeve on the end of the threaded bolt so that the spacing between the brake shoes can be adjusted by turning the bolt in the nut.

According to another preferred but optional feature of the invention, spring means are provided to bias the brake shoes apart.

The above and other features of this invention will be fully understood from the following detailed description and the accompanying drawings, in which:

FIG. 1 is a side elevation, partly in cutaway cross-section, taken generally at line 1—1 of FIG. 4; and FIGS. 2, 3, 4, and 5 are cross-sections taken generally at lines 2—2, 3—3, 4—4, and 5—5, respectively, in FIG. 1.

A brake 10 according to the invention is shown in FIG. 1. Its purpose is to control rotation of a shaft 11 which may be the axle of a vehicle, or a rotary shaft connected thereto, such as by a chain and sprocket mechanism. The brake includes a brake disc 12 which is fixed to the shaft so as to rotate therewith, and this brake will act to slow down rotation of the shaft by a clamping action on the disc.

Structure 13 which may be the vehicle frame, or structure connected thereto, is rotationally stationary relative to shaft 11. To this structure there is mounted by means such as welding or any other desired means of attachment, a housing 14. The structure and the housing have openings 15, 16, respectively. As best shown in FIG. 2, the housing is a piece of open-ended rectangular tubing with wall portions cut away. Both ends are open, and the cutaway portion is best shown in FIG. 4 where slots 17 are formed at two spaced locations near the end of one wall, leaving a tongue 18 projecting to the left in FIG. 4. The tongue has an opening 19 near its end in alignment with openings 15, 16. Openings 20 pass the disc.

Fulcrum points 21, 22 are located on walls 23, 24 respectively, of the housing. Brake arms 25 and 26 are best shown in FIGS. 1 and 2. With reference to brake arm 25 in FIG. 2, whose cross-section is typical of both brake arms, it will be noted that this brake arm has a central bight 27 and a pair of flanges 28, 29. The bight is bent to form an angle so as to provide a fulcrum point 25a which bears against fulcrum point 21 on wall 23.

Brake arm 26 is similarly constructed with bight flanges, and a fulcrum point 26a, which bears against fulcrum point 22 on wall 24. It will thereby be seen that these brake arms are rockable against the inside surfaces of walls 23 and 24. The fulcrum points could be made a pinned joint if desired, but the simplicity of this device derived by merely sliding the arms into a tube is a matter of great convenience in making speedy repairs. It also makes for a less expensive assembly.

The housing also has walls 23a, 24a, which form restraint means at opposite sides of the fulcrum points which serve to restrain the brake arms and brake shoes from movement in the circumferential direction. The circumferential direction is in the plane or in planes parallel to the plane of rotation of disc 12.

At the ends of the brake arms adjacent to the disc there are a pair of brake shoes 31, 32. These brake shoes are U-shaped channel members attached to the brake arms by pivot shafts 33, 34. The brake shoes carry conventional linings 35, 36 of friction-type material.

A bias spring 37 which may be made as a U-shape spring, has one of its ends attached to each of shafts 33 and 34 so as to bias them apart, thereby relieving the brake shoes from contact with the disc unless the brakes are applied by exterior force.

The other end of brake arm 25 has an aperture 38 aligned with openings 15 and 16. The structure around the aperture forms a nut seat 39. A threaded bolt 40 passes through openings 15, 16 and aperture 38, and to its threads there is threaded a square locknut 41. This nut has a crown 42 in the plane of FIG. 1, but not in the plane of FIG. 2, so that it can seat against the nut sleeve and rock in the plane of FIG. 1. The nut is too wide to turn inside the channel of brake arm 25 so that its position on the threaded bolt can be adjusted simply by turning the bolt.

The unheaded end 43 (sometimes called the "free end") of the threaded bolt is reduced to form a nib 44. A sleeve 45 fits rotatably over the nib and includes a shoulder 46. It will thereby be seen that this shoulder forms essentially a portion of the threaded bolt, but this construction enables the bolt to turn freely inside the sleeve which makes adjustment easier. The sleeve is freely rotatable on the nib, and is engageable with the bolt so as to be restrained against axial movement relative thereto when pressed toward the nut and against the bolt. Thus force exerted upwardly on the sleeve is transmitted to bolt 40.

The end of brake arm 26 most distant from its brake shoe has a shaft 47 between its flanges that extends beyond them to pivotally join the arm to flanges 48, 49 of lever 50. This lever includes a lever arm 51 which extends outside the housing and a flange 52 with an aperture 53 through which sleeve 45 passes. The flange structure around the aperture forms a shoulder seat 54 against which shoulder 46 bears. The shoulder is on the opposite side of shaft 47 from pivot point 26a.

The sleeve also passes through opening 19 in tongue 18 which stabilizes the free end of the bolt. Linkage 55 is attached to the free end of the lever and is pulled to apply the brake.

The operation of the brake is as follows. To adjust the brake linings relative to the disc, once the linkage is set up, it is only necessary to turn the headed end of the threaded bolt to move nut 41 along the bolt, thereby either spreading apart, or permitting the springs to draw together the left-hand ends of the brake arms, as seen in FIG. 1. Moving the nut away from the shoulder will move the linings closer to the disc, and moving it closer to the shoulder will move the linings farther away from the disc. Because the square nut cannot turn in the channel formed by brake arm 25, there is no need to hold this nut while the bolt is being turned.

When the brakes are to be applied, the linkage is moved in the direction shown by arrow 56 in FIG. 1. This rotates the points defined by shaft 47 and the shoulder in a clockwise direction, thereby moving the left-hand end of brake arm 26 down and moving the threaded bolt up. The threaded bolt transmits this movement through the nut to the left-hand end of brake arm 25, moving it up. The brake arms thus both rock around their pivot points with their left-hand ends being moved apart, thereby causing their right-hand ends to be moved together, thus pressing the brake linings against the disc. Release of the brake linkage will permit the bias spring to move the brake linings apart. The side walls of the housing support the brake arms as they apply their pressure.

It will be seen that this is a very simple structure, easy to maintain and easy to adjust. The brake adjustment is merely that of turning bolt 40. The brake can be quickly removed and replaced simply by unthreading the bolt from nut 41 and removing the bolt. Then the two brake arms, along with the lever, can be pulled right out of the housing and either new brake shoes can be supplied, or an entire new complete assembly can be supplied, or shaft 47 can be knocked out and new brake arms with new brake shoes can be supplied. The reassembly process is merely that of passing the bolt back through the openings in the apertures and adjusting the position of the nut along the bolt. It will be seen that these brakes can easily and rapidly be adjusted at pit stops, and can even be completely removed and replaced simply by removal of the bolt.

It will thereby be appreciated that this is a useful, simple, and inexpensive disc-type brake that is particularly suitable for racing vehicles, due to the ease and speed of service and replacement.

This invention is not to be limited by the embodiment shown in the drawings and described in the description which is given by way of example and not of limitation, but only in accordance with the scope of the appended claims.

What is claimed is:

1. A brake comprising: a rotatable disc whose rotation in a circumferential direction is to be braked; a housing mountable to structure fixed relative to the disc, said housing including a pair of fulcrum points on opposite sides of the disc, and a pair of restraint means; a first and a second brake arm inside the housing, each having a fulcrum point coincident with one of the fulcrum points on the housing so that each arm is rockable at a respective fulcrum point; a pair of brake shoes; means mounting one of said brake shoes to each of said brake arms at a first side of the pivot points, the brake shoes being so disposed and arranged as to be brought to bear against opposite sides of the disc; a threaded bolt, the housing having an opening in the plane of rotation of the brake arms through which the bolt passes, the first brake arm being located immediately adjacent the said opening and having an aperture through which the bolt passes, the portion of the said first brake arm surrounding the aperture forming a nut seat; a nut threaded to said bolt on the opposite side of the said first brake arm from the opening and bearing against said nut seat; a lever pivotally jointed to the second brake arm on the opposite side of its pivot point from its respective brake shoe; a shoulder seat carried by said lever facing the nut seat; and a shoulder on the threaded bolt bearing against the shoulder seat, the shoulder seat and the fulcrum point of the second brake arm being on opposite sides of the location where the lever is pivotally jointed to the second brake arm, the restraint means being on opposite sides of the brake arms and adapted to restrain the brake arms and shoes from movement in the circumferential direction whereby drawing the lever in a direction away from the brake shoes moves the ends of the arms remote from the brake shoes apart to press the brake shoes against the disc.

2. A brake according to claim 1 in which spring means interconnect the brake arms to bias the brake shoes away from the disc.

3. A brake according to claim 1 in which the brake shoes are pivotally mounted to their respective brake arms.

4. A brake according to claim 1 in which the shoulder is provided as a sleeve freely rotatably fitted to the threaded bolt and engageable with the bolt so as to be restrained against axial movement relative thereto when pressed toward the nut.

5. A brake according to claim 3 in which the shoulder is provided as a sleeve freely rotatably fitted to the threaded bolt, and engageable with the bolt so as to be restrained against axial movement relative thereto when pressed toward the nut, and in which spring means interconnect the brake arms to bias the brake shoes away from the springs.

6. A brake comprising: a rotatable disc whose rotation is to be braked; a rectangular-sectioned open-ended housing mountable to structure fixed relative to the disc, two interior walls of said housing providing a pair of fulcrum points on the opposite sides of the disc; a pair of brake arms within said housing, each of said arms being channel members having a central bight and a pair of flanges, each of said bights being bent at an angle so as to form a fulcrum point disposed coincident with a respective one of the fulcrum points on the housing so that each arm is rockable about a fulcrum point; a pair of brake shoes, one mounted to each of said brake arms at a first side of the pivot points; pins rotatably mounting said brake shoes to said brake arms, the brake shoes bearing against the disc on opposite sides thereof; a threaded bolt, the housing having an opening in the plane of rotation of the brake arms through which the bolt passes, the brake arm immediately adjacent the said opening having an aperture through which the bolt passes, the portion of the brake arm surrounding the aperture forming a nut seat; a nut threaded to said bolt on the opposite side of the brake arm from the opening and bearing against said nut seat, said nut having such dimensions as to be substantially restrained against rotation by the flanges of the first brake arm; a lever having a pair of side flanges pivotally jointed to the second of said brake arms on the opposite side of its respective pivot point from its respective brake shoe; a pin joining the said second brake arm and the lever in said manner; a shoulder seat carried by said lever between its flanges facing the nut seat; a shoulder on the threaded bolt bearing against the shoulder seat; the wall against which the second brake arm bears having a pair of cut-out slots forming a central tongue with an aperture for passing the threaded bolt, the flanges on the lever entering said slots whereby drawing the lever in a direction away from the brake shoes moves the ends of the arms remote from the brake shoes apart to press the brake shoes against the disc.

7. A brake according to claim 6 in which spring means interconnect the brake arms to bias the brake shoes away from the disc.

8. A brake according to claim 6 in which the shoulder is provided as a sleeve freely rotatably fitted to the threaded bolt, and engageable with the bolt so as to be restrained against axial movement relative thereto when pressed toward the nut.

9. A brake according to claim 6 in which the shoulder is provided as a sleeve freely rotatably fitted to the threaded bolt, and engageable with the bolt so as to be restrained against axial movement relative thereto when pressed toward the nut, and in which spring means interconnect the brake arms to bias the brake shoes away from the springs.

References Cited in the file of this patent

UNITED STATES PATENTS 2,284,605     Eksergian et al. _____ May 26, 1942